June 9, 1931. W. R. NASON 1,809,596
COMBINATION CANTEEN AND MESS KIT
Filed Jan. 5, 1929
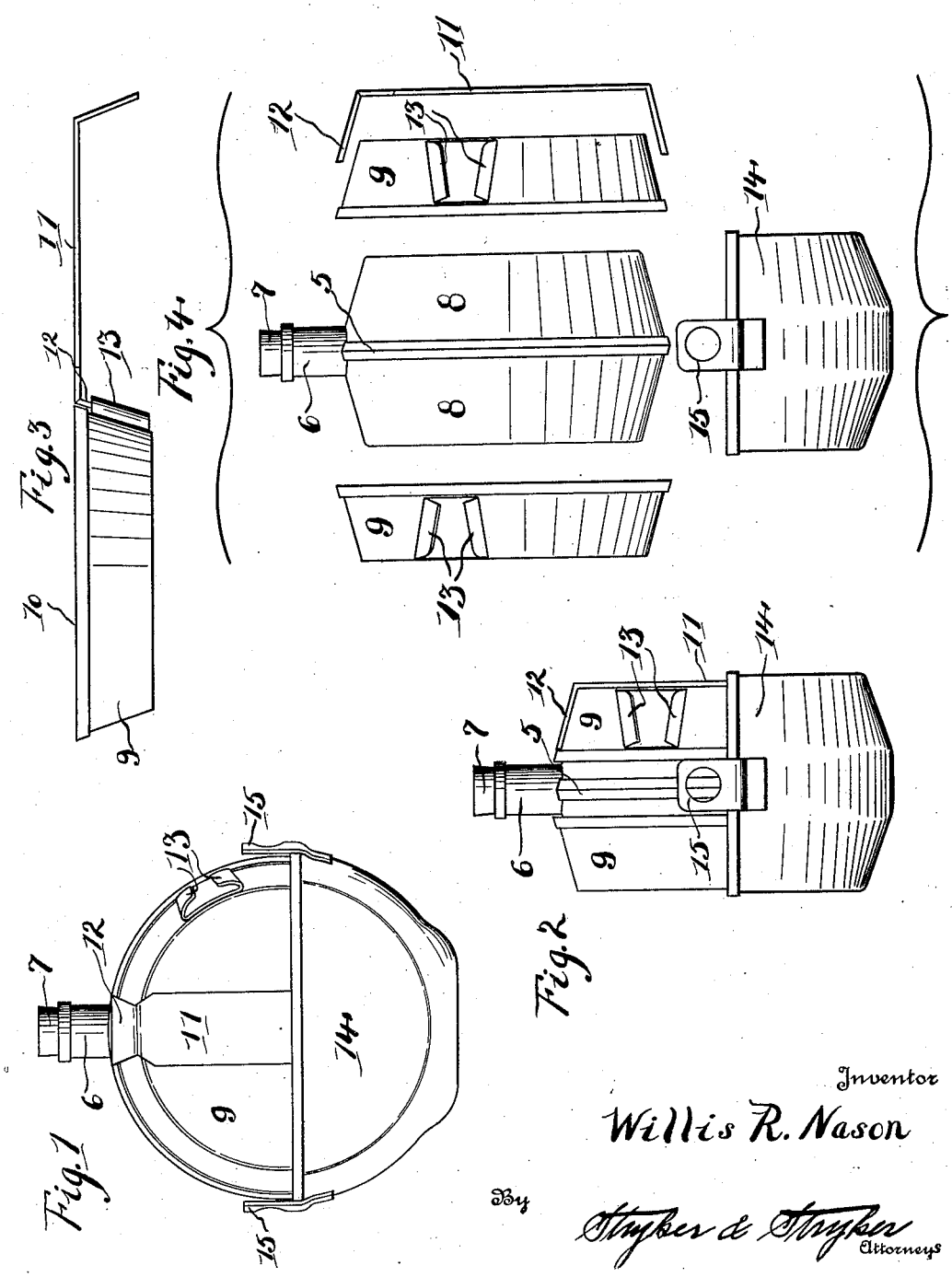
Inventor
Willis R. Nason
By
Stryker & Stryker
Attorneys Patented June 9, 1931

1,809,596

UNITED STATES PATENT OFFICE

WILLIS R. NASON, OF ST. PAUL, MINNESOTA

COMBINATION CANTEEN AND MESS KIT

Application filed January 5, 1929. Serial No. 330,488.

This invention relates to a combination canteen and mess kit particularly intended for scout or army use, although suitable for general outing and camping purposes.

It is my object to provide an unusually complete, compact and inexpensive mess outfit adapted to facilitate cooking over an open fire and at the same time offering a minimum of encumbrance when carried.

The invenion will be best understood by reference to the accompanying drawings in which Figure 1 is a side elevation of my improved device, assembled in compact form for carrying; Fig. 2 is an elevation of the device as viewed from the right of Fig. 1; Fig. 3 is a side view of one of the pans with the handle attached, as for use, and Fig. 4 shows the several parts of the device separated, but in their relative positions for assembling in compact form.

I provide a canteen 5 having a suitable neck 6 and stopper 7 consituting a closure. Frusto-conical portions 8 of the canteen are respectively adapted to nest within pans 9 when the parts are assembled for carrying. Each of the pans 9 has the usual open top 10. A handle 11 is formed with a dovetail-shaped end 12 adapted to be removably inserted between a pair of flanges 13 rigidly secured to the outer periphery of each of the pans 9. The flanges 13 converge upward to receive the end 12 between them as indicated in Fig. 3 and when attached to the flanges 13 the handle 11 may be employed to hold the pan 9 over a fire. When not required, the handle 11 may be detached from the pan and is formed to fit the bottom and sides of the pan as indicated in Figs. 1, 2 and 3.

A kettle 14 is provided at opposite sides with a pair of eye members 15 adapted to receive a bail or long, rigid rod for supporting the kettle over a fire. These eye members 15 are rigidly secured to the kettle 14 and project upward from its upper edge so that a stick or other suitable support may be inserted through the openings in both members with ease. The kettle 14 is formed to receive the lower periphery of the canteen 5 with the pans 9 in nesting engagement therewith as shown in Figs. 1 and 2. The handle 11 may also be held in place by the kettle when assembled, as illustrated, for carrying. The kettle fits snugly upon the exterior of the pans 9, handle 11 and canteen 5 when in the nesting positions illustrated to hold the parts together in a compact, unitary body which may be carried with ease. Obviously the entire assembly of parts may be inserted in a fabric cover of any well-known or suitable design, if desired. A sling to carry the outfit may be secured to the members 15 if no cover is employed.

The frusto-conical form of the pans 9 and similarly formed portions 8 of the canteen facilitate assembling the parts for carrying and also make it possible to utilize the standard or common type of metal plate or pan in the mess kit. Facility in handling the pans is also promoted by making the handle 11 separate so that it is attached only when the pans are hot or when they are held over a fire. The upwardly converging flanges 13 on the pans and dovetail part 12 of the handle 11 afford a quickly separable connection which is strong and secure when the handle is in use.

Having described my invention what I claim as new and desire to protect by Letters Patent is:

1. In a mess outfit, a canteen having opposite side portions of frusto-conical shape, a pair of pans of frusto-conical form adapted to fit in nesting engagement with the side portions of the canteen, a removable handle for a pan, means for detachably connecting said handle to at least one of said pans, said handle being formed to fit in nesting engagement with a pan when detached therefrom, a kettle formed to receive and hold together said canteen, pans and handle when in nesting engagement with each other and eye members secured to opposite sides of said kettle to receive a rigid shaft for supporting the same in horizontal position for cooking.

2. In a mess outfit, a canteen, a pair of pans adapted to cap opposite sides of said canteen in nesting engagement therewith, a kettle formed to receive the bottom of said canteen and pans with said pans in nesting engagement with the canteen, said kettle being formed to hold said pans in place on said canteen and eye members projecting upward from opposite sides of said kettle to receive a supporting member for carrying the outfit and adapted to receive a rigid shaft for supporting the kettle in horizontal position for cooking.

3. In a mess outfit, a canteen, a pair of pans adapted to cap opposite sides of said canteen in nesting engagement therewith, a kettle adapted to cap opposite sides of said canteen and pans with said pans in nesting engagement with the canteen, said kettle being formed to hold said pans in place on said canteen and rigid, upwardly projecting, eye members fixed on opposite sides of said kettle to receive a supporting member.

4. In a mess outfit, a canteen having a side portion of frusto-conical shape, a pan of frusto-conical form adapted to fit in nesting engagement with said side portion, a pair of flanges fixed on said pan and each extending parallel to an element of the conical surface of the pan to receive and engage a handle between them, a handle for the pan having an end formed to removably and slidably engage said flanges, said handle being formed to fit in nesting engagement with the pan when detached from said flanges and means for holding said canteen, pan and handle together in nesting engagement with each other.

In testimony whereof, I have hereunto signed my name to this specification.

WILLIS R. NASON.

CERTIFICATE OF CORRECTION.

Patent No. 1,809,596.  Granted June 9, 1931, to

WILLIS R. NASON.

It is hereby certified that error appears in the printed specification of the above numbered patent requiring correction as follows: Page 2, line 11, claim 3, strike out the words "adapted to cap opposite sides" and insert instead formed to receive the bottom; and that the said Letters Patent should be read with this correction therein that the same may conform to the record of the case in the Patent Office.

Signed and sealed this 7th day of July, A. D. 1931.

(Seal)

M. J. Moore,
Acting Commissioner of Patents.